US011113259B2

(12) United States Patent
Vidhani et al.

(10) Patent No.: US 11,113,259 B2
(45) Date of Patent: Sep. 7, 2021

(54) METHOD AND SYSTEM FOR ANALYZING UNSTRUCTURED DATA FOR COMPLIANCE ENFORCEMENT

(71) Applicant: Tata Consultancy Services Limited, Mumbai (IN)

(72) Inventors: Kumar Mansukhlal Vidhani, Pune (IN); Vijayanand Mahadeo Banahatti, Pune (IN); Sachin Premsukh Lodha, Pune (IN); Gangadhara Reddy Sirigireddy, Pune (IN); Govind Vitthal Waghmare, Pune (IN); Nikhil Pradeep Sambhus, Pune (IN); Rekha Chandrakant Pathak, Pune (IN); Payal Ashok Lathi, Pune (IN); Kalyani Mashiwal, Pune (IN); Shefali Soni, Pune (IN); Vidyadhar Rao, Pune (IN); Rosni Kottekulam Vasu, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 282 days.

(21) Appl. No.: 16/052,356

(22) Filed: Aug. 1, 2018

(65) Prior Publication Data
US 2019/0042567 A1   Feb. 7, 2019

(30) Foreign Application Priority Data

Aug. 2, 2017 (IN) .............................. 201721019469

(51) Int. Cl.
*G06F 16/23* (2019.01)
*G06F 9/46* (2006.01)
(Continued)

(52) U.S. Cl.
CPC .............. *G06F 16/23* (2019.01); *G06F 9/466* (2013.01); *G06F 16/33* (2019.01); *G06F 21/6245* (2013.01); *H04L 67/02* (2013.01)

(58) Field of Classification Search
CPC .......... G06F 16/23; G06F 16/33; G06F 9/466; G06F 21/6245; H04L 67/02
(Continued)

(56) References Cited

U.S. PATENT DOCUMENTS 5,737,592 A   4/1998   Nguyen et al.
5,778,178 A   7/1998   Arunachalam
(Continued)

*Primary Examiner* — Ashish Thomas
*Assistant Examiner* — Abdullah A Daud
(74) *Attorney, Agent, or Firm* — Finnegan, Henderson, Farabow, Garrett & Dunner, LLP

(57) ABSTRACT

Method and system for analyzing unstructured data for compliance enforcement is disclosed. The system provides a comprehensive compliance enforcement platform, which enables purpose based data processing in an enterprise to support automatic discovery of purposes and linking between data fields and purposes. The system creates a single view of data associated with the data subject for enforcing the data subject's right for data protection and privacy. The system supports database like transactions for unstructured data over web and ensures Atomicity, Consistency, Isolation and Durability (ACID) properties of these transactions. Thus, the system creates a uniform data layer or a web view for data residing in the unstructured and semi-structured data, spread across the enterprise. The transactions on the unstructured data include READ operation, UPDATE operation, and DELETE operation using hypertext transfer protocol (http) over the unstructured data.

11 Claims, 6 Drawing Sheets

(51) Int. Cl.
*G06F 16/33* (2019.01)
*G06F 21/62* (2013.01)
*H04L 29/08* (2006.01)

(58) Field of Classification Search
USPC .......................................................... 707/790
See application file for complete search history.

(56) References Cited

U.S. PATENT DOCUMENTS

| | | | |
|---|---|---|---|
| 6,978,367 B1* | 12/2005 | Hind ................... | G06F 21/577 380/273 |
| 7,849,048 B2* | 12/2010 | Langseth .............. | G06F 16/254 707/602 |
| 9,626,346 B2 | 4/2017 | Kim | |
| 2002/0052796 A1* | 5/2002 | Tadokoro ........... | G06Q 30/0635 705/26.42 |
| 2002/0065911 A1 | 5/2002 | von Klopp et al. | |
| 2005/0182724 A1* | 8/2005 | Willard ................. | G06Q 20/04 705/44 |
| 2006/0136564 A1* | 6/2006 | Ambrose .............. | G06Q 30/06 709/217 |
| 2007/0011134 A1* | 1/2007 | Langseth .............. | G06F 16/254 |
| 2009/0006487 A1* | 1/2009 | Gavrilov ............. | G06F 16/1844 |
| 2013/0305140 A1* | 11/2013 | Ruan ................... | H04L 67/2828 715/234 |
| 2018/0075251 A1* | 3/2018 | Van Hoof ........... | G06F 21/6227 |
| 2018/0150443 A1* | 5/2018 | Singleton ............. | G06F 9/451 |
| 2018/0341369 A1* | 11/2018 | Johnston ............ | G06F 16/2228 |

\* cited by examiner

METHOD AND SYSTEM FOR ANALYZING UNSTRUCTURED DATA FOR COMPLIANCE ENFORCEMENT

CROSS-REFERENCE TO RELATED APPLICATIONS AND PRIORITY

This application takes priority from the Indian filed application no. 201721019469 filed on 2 Aug. 2017 the entirety of which is hereby incorporated by reference.

TECHNICAL FIELD

The embodiments herein generally relate to compliance enforcement and data processing and, more particularly, to processing of unstructured data.

BACKGROUND

Enterprises collect a lot of customer data. They use the collected data to serve customers and execute internal processes. Enterprises are under pressure to protect the collected customer data as they have to comply with privacy and data protection related regulations such as Health Insurance Portability and Accountability (HIPPA), Health Information Technology for Economic and Clinical Health Act (HITECH), Data Protection Regulation (GDPR) and the like. Moreover, recent regulation, such as the GDPR, demands the data to be processed according to purposes for which they were collected and empower customers (data subjects) with rights on their data. This has led to multiple problems for the enterprise such as identifying purposes, linking them with customers' data, enable purpose based processing, implementing customers' rights, etc. Complicating above problems is a current state of data within enterprise which is scattered in multiple resources. The data of data subjects may reside in a structured form (e.g., relational database) or they may be present in the unstructured form such as flat files. To enforce the data subject rights as envisaged by regulations such as the GDPR, there is a need for a solution which supports transactions for the unstructured data. The solid transaction properties of relational database hosting structured data such as Atomicity, Consistency, Isolation and Durability (ACID) need to be built for transactions over unstructured data too which is not present in existing technologies and solutions. Since unstructured data have different program interfaces depending on the content type of resource (XML, DOC, ODT, PDF, etc.), the challenge is to bring them under a protocol which enables uniform processing of the unstructured data.

SUMMARY

Embodiments of the present disclosure present technological improvements as solutions to one or more of the above-mentioned technical problems recognized by the inventors in conventional systems.

In an aspect, there is provided a processor implemented method for analyzing unstructured data for compliance enforcement, the method comprising receiving a transaction request for unstructured data linked to a data subject among a plurality of data subjects registered with an enterprise, wherein the unstructured data comprises a plurality of data fields, wherein each data field among the plurality of data fields is identified by a unique Uniform Resource Identifier (URI) providing web view of the unstructured data. Further, the method comprises identifying a purpose of the transaction request by analyzing the transaction request using text analytics and identifying data-of-interest for the identified purpose from the unstructured data linked to the data subject, wherein the data-of-interest corresponds to a set of data fields among the plurality of data fields of the unstructured data. Further, the method comprises identifying a plurality of sensitive fields among the set of data fields corresponding to the identified data-of-interest using text analytics, wherein each sensitive field among the plurality of sensitive fields is associated with a data subject preference, preset by the data subject. Furthermore, the method comprises processing the transaction request for the set of data fields corresponding to the data-of-interest in accordance with the data subject preference for each sensitive field in the data-of-interest, wherein the set of data fields are accessed using corresponding unique URI.

In another aspect, there is provided a system comprising: one or more data storage devices operatively coupled to the one or more processors and configured to store instructions configured for execution by the one or more processors to receive a transaction request for unstructured data linked to a data subject among a plurality of data subjects registered with an enterprise, wherein the unstructured data comprises a plurality of data fields, wherein each data field among the plurality of data fields is identified by a unique Uniform Resource Identifier (URI) providing web view of the unstructured data. Further, identify a purpose of the transaction request by analyzing the transaction request using text analytics and identifying data-of-interest for the identified purpose from the unstructured data linked to the data subject, wherein the data-of-interest corresponds to a set of data fields among the plurality of data fields of the unstructured data. Further, identify a plurality of sensitive fields among the set of data fields corresponding to the identified data-of-interest using text analytics, wherein each sensitive field among the plurality of sensitive fields is associated with a data subject preference, preset by the data subject. Furthermore, process the transaction request for the set of data fields corresponding to the data-of-interest in accordance with the data subject preference for each sensitive field in the data-of-interest, wherein the set of data fields are accessed using corresponding unique URI.

In yet another aspect, there is provided a computer program product comprising a non-transitory computer readable medium having a computer readable program embodied therein, wherein the computer readable program, when executed on a computing device, causes the computing device to receive a transaction request for unstructured data linked to a data subject among a plurality of data subjects registered with an enterprise, wherein the unstructured data comprises a plurality of data fields, wherein each data field among the plurality of data fields is identified by a unique Uniform Resource Identifier (URI) providing web view of the unstructured data. Further, identify a purpose of the transaction request by analyzing the transaction request using text analytics and identifying data-of-interest for the identified purpose from the unstructured data linked to the data subject, wherein the data-of-interest corresponds to a set of data fields among the plurality of data fields of the unstructured data. Further, identify a plurality of sensitive fields among the set of data fields corresponding to the identified data-of-interest using text analytics, wherein each sensitive field among the plurality of sensitive fields is associated with a data subject preference, preset by the data subject. Furthermore, process the transaction request for the set of data fields corresponding to the data-of-interest in accordance with the data subject preference for each sensitive field in the data-of-interest, wherein the set of data fields are accessed using corresponding unique URI.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
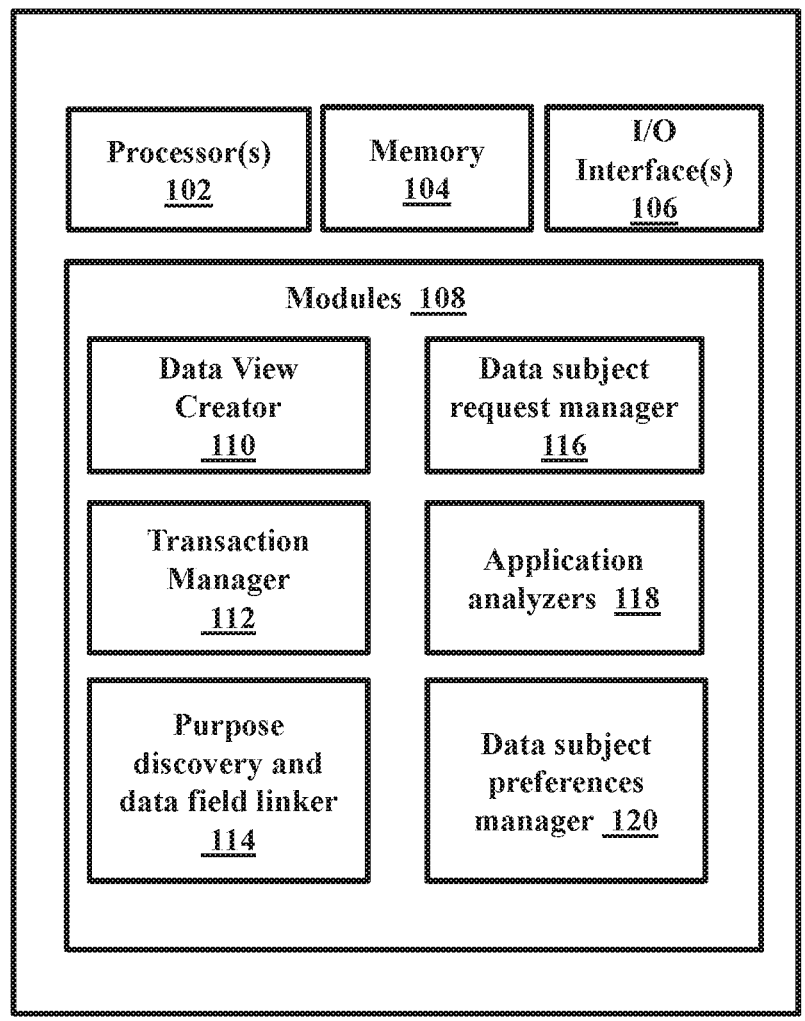
FIG. 1 illustrates a system for analyzing unstructured data for compliance enforcement, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and system for analyzing unstructured data for compliance enforcement. The disclosed method and system provides a comprehensive compliance enforcement platform, which enables purpose based data processing in an enterprise to support automatic discovery of purposes and linking between data fields and purposes. For enforcement of data subject' rights, the system creates a single view of data associated with the data subject (customer). The system supports database like transactions for unstructured data over web and ensures Atomicity, Consistency, Isolation and Durability (ACID) properties of these transactions. Thus, the system creates a uniform data layer or a web view for data in the unstructured and semi-structured document, commonly referred as unstructured data, which resides in a plurality of enterprise resources spread across the enterprise. Further, the system enables transactions on the unstructured data by processing transaction request such as READ operation, UPDATE operation, DELETE operation using hypertext transfer protocol (http) over the unstructured data. The term unstructured data, herein refers to all data, not present in a structured format. This includes both unstructured and semi-structured data. While carrying out the transactions, the system ensures consistency of data, concurrency of transactions using http protocol over unstructured and semi-structured data.

Referring now to the drawings, and more particularly to FIG. 1 through FIG. 6 where similar reference characters denote corresponding features consistently throughout the figures, there are shown preferred embodiments and these embodiments are described in the context of the following exemplary system and/or method.

FIG. 1 illustrates a system analyzing unstructured data for compliance enforcement, in accordance with an embodiment of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules 108 of the system 100 can be stored in the memory 104 to perform the methodology described herein in conjunction with FIG. 2 and FIG. 3 for processing the unstructured data residing in the enterprise resources spread across the enterprise. In an embodiments the modules 108 include a data view creator 110, a transaction manager 112, a purpose discovery and data field linker 114, a data subject requests manager 116, application analyzers 118 and a data subject preferences manager 120.

Figure 2:
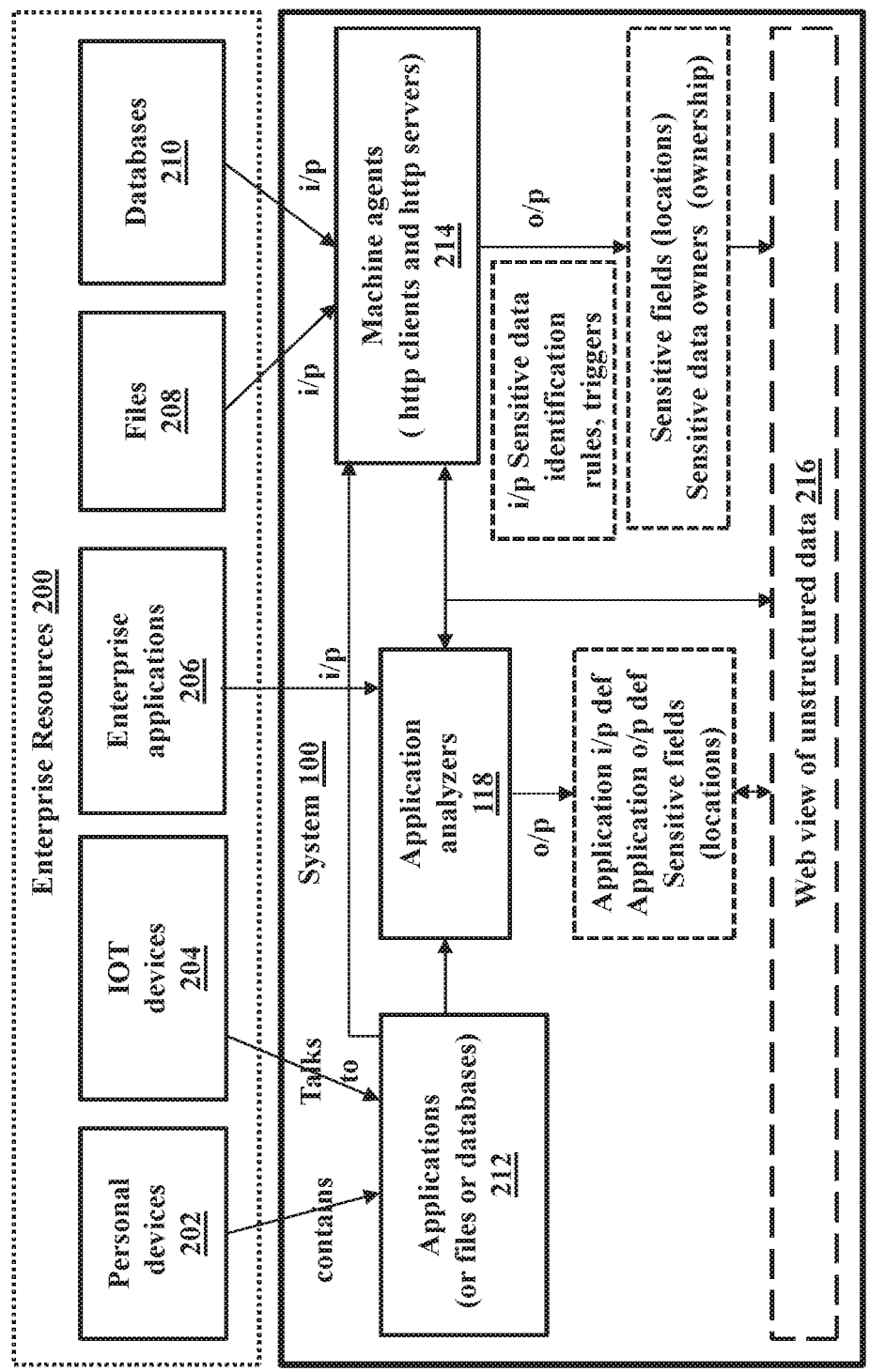
FIG. 2 illustrates an architecture of the system of FIG. 1 for analyzing unstructured data for compliance enforcement, in accordance with an embodiment of the present disclosure.

FIG. 2 illustrates an architecture of the system 100 of FIG. 1 for analyzing unstructured data for compliance enforcement, in accordance with an embodiment of the present disclosure. The system 100, providing the compliance enforcement platform, for analyzing the unstructured data, comprises the modules such as the data view creator 110, the transaction manager 112, the purpose discovery and data field linker 114, the data subject requests manager 116, the application analyzers 118 and the data subject preferences manager 120.

The system 100 is linked with enterprise resources 200 and the unstructured data linked to a plurality of data subjects registered with the enterprise is spread across the enterprise resources 200. The enterprises resources include data resources such as personal devices 202 (for example, a laptop, and a mobile), Internet of Things (IOT) devices 204 (such as sensors), enterprise applications 206 (for example, web applications and standalone applications), files 208 (for example, DOCX and XML files) and databases 210 (for example relational database management system (RDBMS). The modules 108 of the system 100 and their functions are described below and in conjunction with FIGS. 4 to 6.

Whenever, say a user initiates transaction request, to process the data associated with a data subject, the purpose discovery and data field linker 114 identifies the purpose behind the transaction request. The basic tenet behind recent regulations for privacy is to enforce purpose based processing of data subjects' data in all enterprise operations. Existing text analytics tools can be used to detect purposes by processing the documents containing enterprise's business processes. Enterprise business process is a sequence of steps (operations) to achieve certain business objective. It is highly likely that business processes are executed on business entities (like customers, account number, employees, reports, etc.).

The purpose discovery and data field linker 114 utilizes Natural Language Processing (NLP) tools (e.g., Stanford's NLP parser, open NLP) to process textual content of the documents. NLP tools assign Part-of-Speech (PoS) tags to words in the documents. PoS output can be further processed for reason analysis to extract candidate purposes (purpose of the transaction request for processing the data (herein the unstructured data associated with the $data_{subject}$). Reason analysis includes processing of certain key phrases indicative of purposes such as because of, due to, etc. to extract the candidate purposes from the sentence. Other technique includes text summarization approach to extract a purpose if it spreads across multiple steps in the documents.

The unstructured data is represented or displayed to the user as a web view 216 providing uniform representation for the unstructured data residing in the enterprise resources 200. The data view creator creates this web view of enterprise resources 200 in order to apply http protocol to process the data while being compliant with the data subject's rights as laid down by data protection and privacy standards such as the GDPR.

The definition of enterprise resource 200 is not limited only to document. e.g., text document, word document, XML document but the system 100 further extends it at a level of word or phrase. Technically, it is an n-gram where n is the input to the system 100. Information linked to the data subject such as Date of birth, Address, Name, Social Security Number, Account Number, etc. are converted into web accessible resources by the data view creator 110. The data view creator 110 uses a combination of text analysis tools and database to link resources with identity of data subjects. Once the linking is done, they are made web accessible through use of Uniform Resource Identifiers (URIs). The data view creator is further explained in conjunction with FIG. 3 and FIG. 4.

The data residing in the enterprise resources 200, represented as application (or files or databases) 212 and the enterprise applications 206 is processed by the system 100.

The application analyzers 118 analyze the applications 212 given as input and generate output consisting of what information is generated, processed and the target of that generated and processed information. Pushing of information in the resources by applications is referred as information dispersion. The system 100 utilizes an application centric strategy to estimate the information being dispersed within an enterprise. The strategy is provided below:
1. Convert application into a graph.
2. For each method node of the graph, annotate its input parameters.
3. Create associations between the input parameters and variables pointing to input parameters. Track the variables to identify object creations sites.
5. Track the variables of the identified object creation sites based on equality constraints on program nodes or paths or a combination of both.
6. Capture the sink programming nodes
7. Check the input parameters of sink nodes and compare them with the tracked variables.
8. If a match is found, identify the resource linked with a sink
9. Send resource meta-data and input to the resource to compliance enforcement platform.

The data subject requests manager 116 manages the data subject requests, which is a big and complex process consisting of multiple steps. The data subject requests manager consists of multiple sub-components and they together manage and enforce the data subject request on the enterprise resources 200. As soon as a data subject initiates the transaction request, a workflow for that request is initialized. A workflow manager, which is subcomponent of the data subject requests manager 116, handles all the work flow tasks for each request. Typically in the enterprise, roles of employees are fixed and business process steps are executed by employees belonging to certain roles. Business processes are fed into the workflow manager along with role related information. For each data subject request, process steps are fixed and roles are attached. An important module of the workflow manager is a data subject request filter. Not all requests are genuine and hence filtering of requests is must to avoid excess load on employees belonging to certain roles. Filtering requests could mean one of the following things: Rejecting a request, Automatic generating response to the request, and Redirecting the request to some alternate or exceptional flow. Rules to automatically filter requests are captured and given as input compliance enforcement platform. Rules are classified into the following types. One type of rules are based on time dimension and called temporal rules (e.g., a rule for recently raised request). Another type of rules is based on values of attributes of request and is called attributes rules (e.g., a rule to initiate special workflow for minor).

The data subject preference manger 120 captures data subject preferences for different data fields and convert them into a privacy policy for respective data subject. Privacy policy is enforced in the step "Server receives http request and generates response" (shown in FIG. 5 and FIG. 6). In an embodiment, the system 100 implements the data subject preference manger 120 in accordance with method disclosed in U.S. Pat. No. 9,928,381B2.

Figure 3:
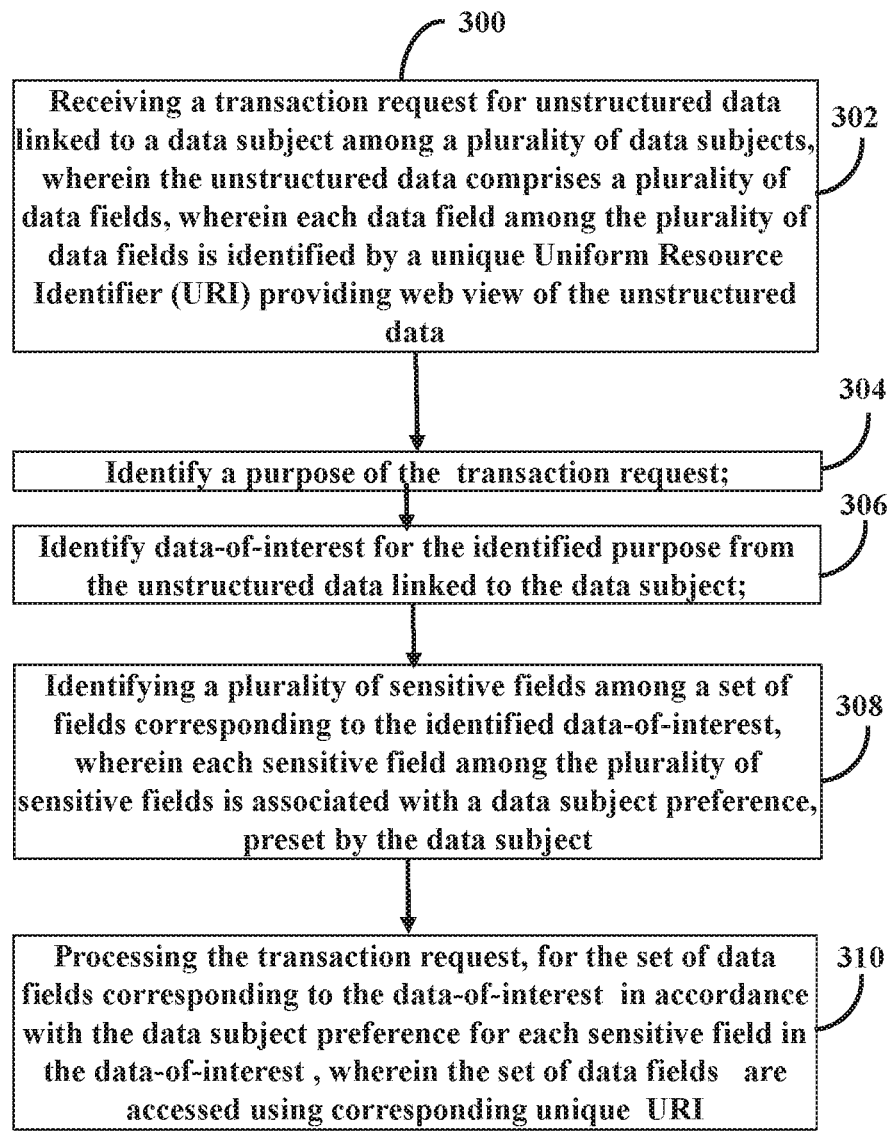
FIG. 3 illustrates an exemplary flow diagram for a processor implemented method for analyzing unstructured data for compliance enforcement using system of FIG. 1, in accordance with an embodiment of the present disclosure.

FIG. 3 illustrate an exemplary flow diagrams for a processor implemented method 300 for analyzing unstructured data for compliance enforcement using system of FIG. 1, in accordance with an embodiment of the present disclosure. In an embodiment, the system 100 includes one or more data storage devices or the memory 104 operatively coupled to the one or more processors 102 and is configured to store instructions configured for execution of steps of the method 300 by the one or more processors 102. The steps of the method 300 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment, of the present disclosure, the data view creator 110, executed by the one or more processors 102, is configured to create the web view for a plurality of data fields of the unstructured data linked to the plurality of subjects registered with the enterprise. The unstructured data may be spread across the enterprise resources 200. Each of the plurality of data fields is identified with a unique URI.

Figure 4:
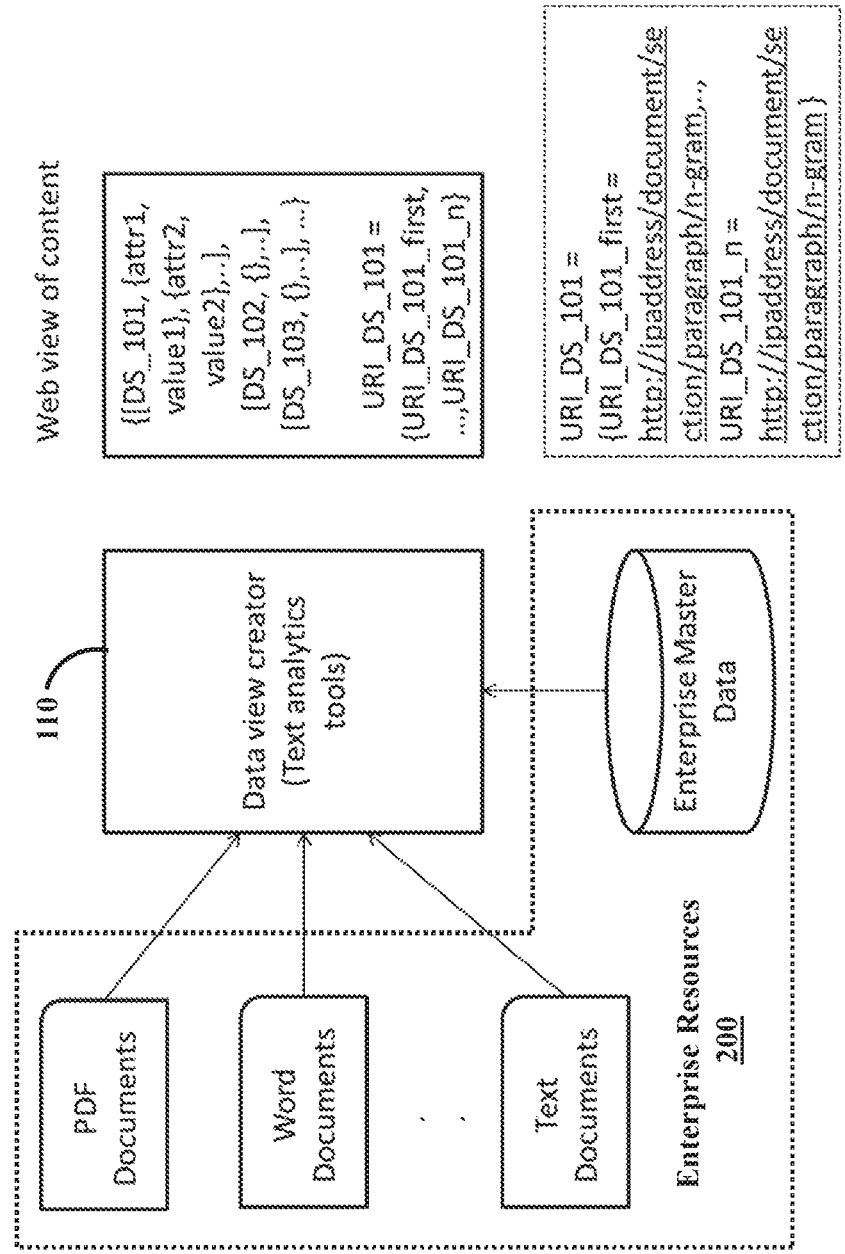
FIG. 4 is an example illustrating a web view of the unstructured data of a plurality of data subjects, in accordance with an embodiment of the present disclosure.
Figure 5:
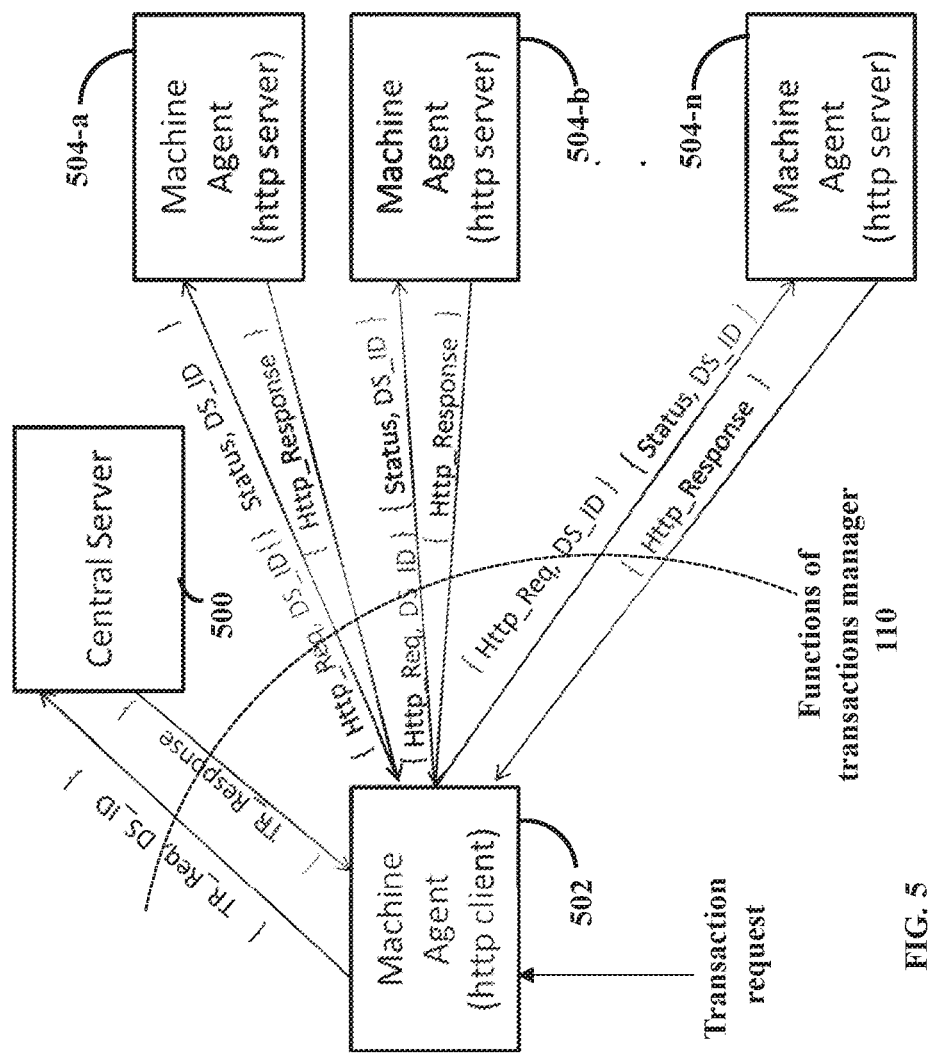
FIG. 5 illustrates functions of a transaction manager of the system of FIG. 1 for processing transaction request for the unstructured data, in accordance with an embodiment of the present disclosure.

As depicted in FIG. 4 the data view creator 110 takes an enterprise master data (database 210) as input and processes the semi-structured and unstructured data using external analytics tools. These tools include but not limited to NLP tools, Named Entity Recognition (NER) tools, Text summarization tools, etc. The output of processing is a mapping between information residing in the documents with data subject. This mapping is achieved through URI, which makes it web enabled. Machine agents 214 (comprising http clients and http servers such as depicted in FIG. 5) running on enterprise computers or end devices include the data view creator 110, which creates the web view of information by mapping the content with data subject using URI. Once that view is created, it becomes amenable to http transactions.

For example, assume enterprise has machine M1 which has performance evaluation document created by HR Adam (user) for employee Alice. The document (unstructured data) contains appraisal details of Alice. Details (one or more data fields in the unstructured data) include Name, Gender, Date of birth, Date of joining, Performance remarks, and Evaluation score of Alice, which correspond to the plurality of data fields of the unstructured data linked to Alice (data subject). A data view creator of machine agent MA residing on M1 processes the performance evaluation document and link that information to Alice using Enterprise master data. If master data has assigned unique id 111 to Alice then, the web view of Alice's information will look as follows with each data field identified with unique URI.

[111, {name:
{http://M1/performance_eval/section[2]/paragraph[3]/sentence[2]},
gender:
{http://M1/performance_eval/section[2]/paragraph[9]/sentence[4]}, date
of birth:
{http://M1/performance_eval/section[3]/paragraph[6]/sentence[1]}, date
of joining:
{http://M1/performance_eval/section[2]/paragraph[1]/sentence[6]},
performance remark:
{http://M1/performance_eval/section[3]/paragraph[4]/sentence[3]},
evaluation score:
{http://M1/performance_eval/section[4]/paragraph[3]/sentence[2]}}]

In an embodiment of the present disclosure, at step 302, the transactions manger 112 executed by the one or more processors 102 is configured to receive the transaction request for the unstructured data linked to the data subject among the plurality of data subjects registered with the enterprise. The unstructured data can be viewed as described in example of Adam and Alice above. The unstructured data linked to the data subject comprises the plurality of data fields, wherein each data field is identified by a unique URI, providing web view of the unstructured data.

At step 304, the purpose discovery and data field linker 114 executed by the one or more hardware processors 102 is configured to identify the purpose of the transaction request using exiting text analytic techniques. At step 306, the one or more hardware processors 102 are configured to identify data-of-interest for the identified purpose from all the unstructured data linked to the data subject. At step 308, the data view creator 110 executed by the one or more hardware processors are configured to identify a plurality of sensitive fields among the plurality of data fields (as depicted in FIG. 2) corresponding to the identified data-of-interest, wherein each sensitive field among the plurality of sensitive fields is associated with a data subject preference, preset by the data subject. The sensitive fields are identified using existing text analytic tools and techniques. At step 310, the transaction manager 112 executed by the one or more hardware processors 102, is configured to process the transaction request, for the set of data fields corresponding to the data-of-interest in accordance with the data subject preference for each sensitive field in the data-of-interest. The set of data fields are accessed using corresponding unique URI. The functions of the transaction manger 112 to process the transaction request are explained in conjunction with FIG. 5 and method 600 of FIG. 6.

Figure 6:
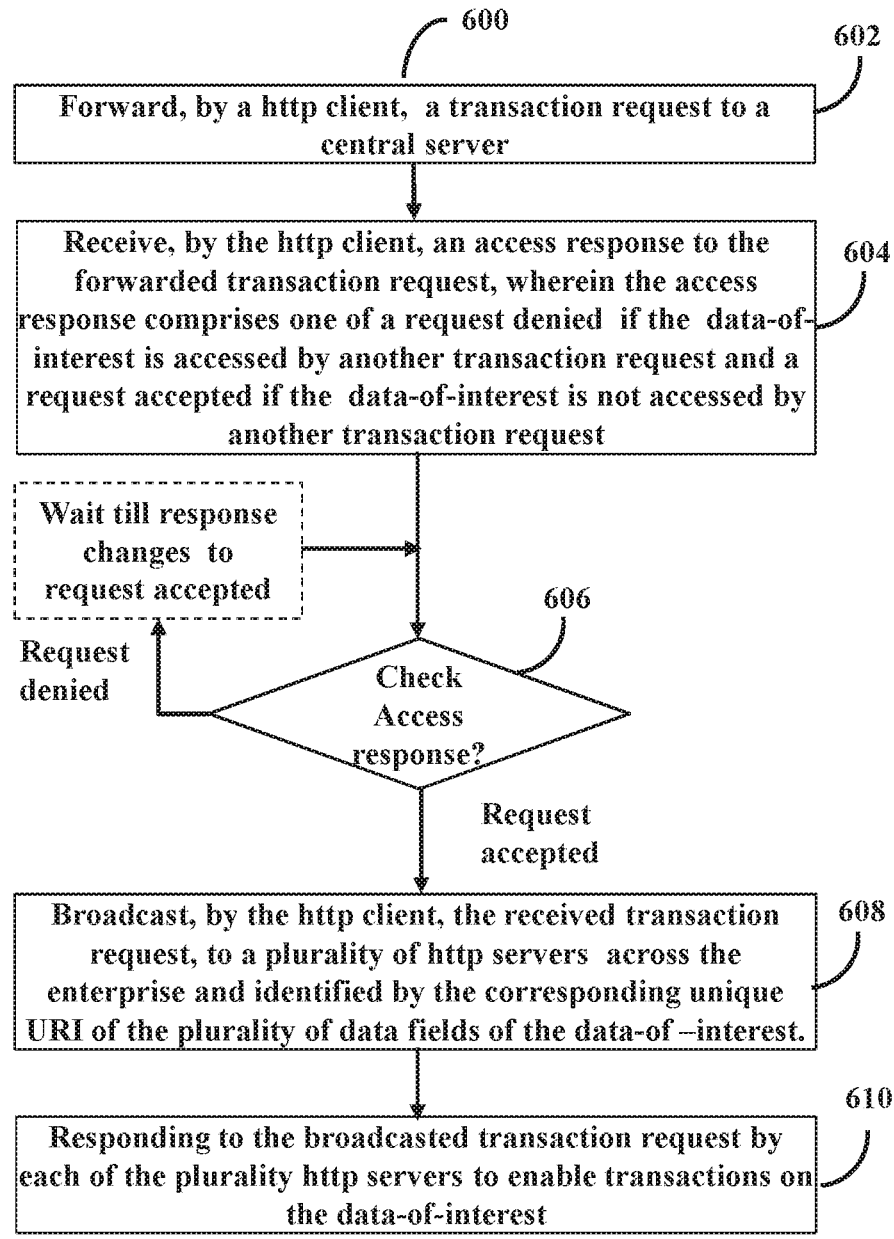
FIG. 6 is a flow diagram illustrating a method for processing transaction request on the unstructured data using the system of FIG. 1, in accordance with an embodiment of the present disclosure.

FIG. 6 is a flow diagram illustrating a method 600 for processing transaction request on the unstructured data using the system of FIG. 1, in accordance with an embodiment of the present disclosure. The method 600 is explained in conjunction with FIG. 5.

As depicted in FIG. 5, at step 602, the transaction manager 112 executed by the one or more hardware processors 102, is configured to allow a http client 502 (running on computer used by the requesting user) to forward the received transaction request (Tr_Req_DS_ID), corresponding to the data-of-interest of the data subject, to a central server 500. At step 604, the transaction manager 112 executed by the one or more hardware processors 102, is configured to allow the http client 502 to receive an access response (Tr_Response) to the forwarded transaction request (Tr_Req_DS_ID). The access response comprises one of 'request denied' if the data-of-interest is accessed by another transaction request and a 'request accepted' if the data-of-interest is not accessed by another transaction request. If the access response (Tr_Response), at step 606, corresponds to the request accepted, then at step 608, the transaction manager 112 executed by the one or more hardware processors 102, is configured to allow the http client 502 to broadcast the received transaction request (Tr_Req_DS_ID) to a plurality of http servers (504-a through 504-n) spread across the enterprise. Thus, the http client 502 broadcasts the transaction request as (Http_Req, DS_ID||Status, DS_ID) The http servers corresponding to the plurality of data fields of the data-of-interest are identified by a unique Uniform Resource Locator (URL). If at step 606, the access response is 'request denied' the transaction manager 112 waits till the access response changes to 'request accepted'. At step 608, the transaction manager 112 executed by the one or more hardware processors 102, is configured to allow the http servers 504-*a* through 504-*n* to respond to the broadcasted transaction request (Tr_Req_DS_ID) enabling transactions on the data-of-interest. The response received by the http client 502 from the http servers (504-*a* to 504-*n*) is (Http_Response)

The manner in which the transaction request is processed for the READ operation, the UPDATE operation or the DELETE operation in provided below:

Case 1: request.type=read (request data in the transaction request=READ)
Step 1: Server reads the request data from http request
Step 2: Server generates the response and set the status as success (HTTP code=200)
Step 3: Server sends the response to client.
Case 2: request.type=update (request data in the transaction request=UPDATE)
Step 1: Server reads the request data from http request
Step 2: Server fetches data of data subject from web view and creates a copy of it and label it as a new copy
Step 3: Server updates data in new copy and set the status as success (HTTP code=200)
Step 4: Server generates and sends the response to client
Step 5: Server waits for HTTP status code from the client
Step 6: Server receives code and if code is OK (200) then, it replaces the original copy by new copy
Step 7: Otherwise retains the original copy
Case 3: request.type=delete (request data in the transaction request=DELETE)
Step 1: Server reads the request data from http request
Step 2: Server fetches data of data subject from web view and creates a copy of it and label it as a new copy
Step 3: Server removes data from the new copy and set the status as success (HTTP code=200)
Step 4: Server sends the response to client
Step 5: Server waits for HTTP status code from the client
Step 6: Server receives the code and if code is OK then, it replaces original copy by new copy
Step 7: Otherwise Server retains original copy The http client 502 accumulates responses from every enterprise machine. It iteratively checks for the status in each response. If every response has status "success", it broadcasts the HTTP 200 code to every enterprise machine. Otherwise, it broadcasts the ERROR code.

Even though, the processing of transacting request for unstructured data is explained herein with system 100 providing the compliance enforcement platform, it is equally applicable for processing data in non-compliance environment use cases. Few use cases are provided below:

Compliance environment—use case:

Alice has submitted all her personal details to ABC Private Ltd. at time of joining. Now that information is spread in different machines of ABC Private Ltd. Alice goes on sick leave for eight days. A health policy of ABC Private Ltd. says that sick leave of more than two days need an HR approval. So Alice submits leave request as per health policy. Adam HR manager of company ABC Private Ltd. wants to approve sick leaves of Alice and he needs an access to Alice's health data. So, 'read' transaction needs to be initiated with purpose of 'Sick leave approval' which fetches Alice's data from different machines.

Non-compliance environment—use case:

Alice needs to change her personal data to reflect new marital status in machines of ABC Private Ltd. She initiates 'update' transaction with purpose of 'Changing own personal data'. Since Alice is the owner of data, data can be updated without interference of anyone.

Thus, the method and system disclosed creates the uniform data layer or a web view for data in the unstructured and semi-structured document, which resides in a plurality of enterprise resources spread across the enterprise. Further, the system enables transactions on the unstructured data such as READ operation, UPDATE operation, DELETE operation using hypertext transfer protocol (http) over the unstructured data. While carrying out the transactions, the system ensures consistency of data, concurrency of transactions using http protocol over unstructured and semi-structured data.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for analyzing unstructured data for compliance enforcement, the method comprising:
   receiving, by a one or more hardware processors, a transaction request for unstructured data linked to a data subject among a plurality of data subjects registered with an enterprise, wherein the unstructured data comprises a plurality of data fields, wherein the plurality of data fields of the unstructured data is converted into web accessible resources and linked with identity of the plurality of data subjects, and wherein each data field among the plurality of data fields is identified by a unique Uniform Resource Identifier (URI) providing a web view of the unstructured data;
   identifying, by the one or more hardware processors, a purpose of the transaction request by analyzing the transaction request using text analytics, wherein the purpose of the transaction request is identified to enforce purpose-based processing of data linked to the data subject in all enterprise operations, such that the processing of data linked to the data subject is in compliance with data protection and privacy regulations;
   identifying, by the one or more hardware processors, data-of-interest for the identified purpose from the unstructured data linked to the data subject, wherein the data-of-interest corresponds to a set of data fields among the plurality of data fields of the unstructured data;
   identifying, by the one or more hardware processors, a plurality of sensitive fields among the set of data fields corresponding to the identified data-of-interest using text analytics, wherein each sensitive field among the plurality of sensitive fields is associated with a data subject preference, preset by the data subject; and
   processing the transaction request, by the one or more hardware processors, for the set of data fields corresponding to the data-of-interest in accordance with the data subject preference for each sensitive field in the data-of-interest, wherein the set of data fields are accessed using corresponding unique URI.

2. The processor implemented method of claim 1, wherein the method comprises generating a web view of unstructured data linked to the plurality of data subjects registered with the enterprise.

3. The processor implemented method of claim 1, wherein processing the transaction request, comprises:
   utilizing a hypertext transfer protocol (http) for communication between a http client receiving the transaction request and a plurality of http servers associated with the data-of-interest, wherein processing of the transaction requests is controlled by a central server.

4. The processor implemented method of claim 3, wherein processing the transaction request using the http protocol comprises:
   forwarding, by the http client, the received transaction request corresponding to the data-of-interest to the central server;
   receiving, by the http client, an access response to the forwarded transaction request, wherein the access response comprises one of a request denied if the data-of-interest is accessed by another transaction request and a request accepted if the data-of-interest is not accessed by another transaction request;
   broadcasting the received transaction request, if the access response corresponds to the request accepted, to a plurality of http servers spread across the enterprise and identified by the corresponding unique URI of the plurality of data fields of the data-of-interest; and
   responding to the broadcasted transaction request, by each of the plurality of http servers, to enable transaction on the data-of-interest.

5. The processor implemented method of claim 4, wherein the transaction request is one of READ operation, UPDATE operation and DELETE operation.

6. A system for analyzing unstructured data for compliance enforcement, the system comprising a memory operatively coupled to one or more hardware processors and configured to store instructions configured for execution by the one or more hardware processors to:
   receive, by the one or more hardware processors, a transaction request for unstructured data linked to a data subject among a plurality of data subjects registered with an enterprise, wherein the unstructured data comprises a plurality of data fields, wherein the plurality of data fields of the unstructured data is converted into web accessible resources and linked with identity of the plurality of data subjects, and wherein each data field among the plurality of data fields is identified by a unique Uniform Resource Identifier (URI) providing a web view of the unstructured data;
   identify, by the one or more hardware processors, a purpose of the transaction request by analyzing the transaction request using text analytics, wherein the purpose of the transaction request is identified to enforce purpose-based processing of data linked to the data subject in all enterprise operations, such that the processing of data linked to the data subject is in compliance with data protection and privacy regulations;
   identify, by the one or more hardware processors, data-of-interest for the identified purpose from the unstructured data linked to the data subject, wherein the data-of-interest corresponds to a set of data fields among the plurality of data fields of the unstructured data;

identify, by the one or more hardware processors, a plurality of sensitive fields among the set of data fields corresponding to the identified data-of-interest using text analytics, wherein each sensitive field among the plurality of sensitive fields is associated with a data subject preference, preset by the data subject; and process the transaction request, by the one or more hardware processors, for the set of data fields corresponding to the data-of-interest in accordance with the data subject preference for each sensitive field in the data-of-interest, wherein the set of data fields are accessed using corresponding unique URI.

7. The system of claim 6, wherein the one or more hardware processors are configured to generate a web view of unstructured data linked to the plurality of data subjects registered with the enterprise.

8. The system of claim 6, wherein the one or more hardware processors are configured to process the transaction request by:

utilizing a hypertext transfer protocol (http) for communication between a http client receiving the transaction request and a plurality of http servers associated with the data-of-interest, wherein processing of the transaction request is controlled by a central server.

9. The system of claim 8, wherein the one or more hardware processors are configured to process the transaction request using the http protocol by:

forwarding, by the http client, the received transaction request corresponding to the data-of-interest to the central server;

receiving, by the http client, an access response to the forwarded transaction request, wherein the access response comprises one of a request denied if the data-of-interest is accessed by another transaction request and a request accepted if the data-of-interest is not accessed by another transaction request;

broadcasting the received transaction request, if the access response corresponds to the request accepted, to a plurality of http servers spread across the enterprise and identified by the corresponding unique URI of the plurality of data fields of the data-of-interest; and responding to the broadcasted transaction request, by each of the plurality of http servers, to enable transaction on the data-of-interest.

10. The system of claim 9, wherein the transaction request is one of READ operation, UPDATE operation and DELETE operation.

11. A computer program product comprising a non-transitory computer readable medium having a computer readable program embodied therein, wherein the computer readable program, when executed on a computing device, causes the computing device to:

receiving a transaction request for unstructured data linked to a data subject among a plurality of data subjects registered with an enterprise, wherein the unstructured data comprises a plurality of data fields, wherein the plurality of data fields of the unstructured data is converted into web accessible resources and linked with identity of the plurality of data subjects, and wherein each data field among the plurality of data fields is identified by a unique Uniform Resource Identifier (URI) providing web view of the unstructured data;

identifying a purpose of the transaction request by analyzing the transaction request using text analytics, wherein the purpose of the transaction request is identified to enforce purpose-based processing of data linked to the data subject in all enterprise operations, such that the processing of data linked to the data subject is in compliance with data protection and privacy regulations;

identifying data-of-interest for the identified purpose from the unstructured data linked to the data subject, wherein the data-of-interest corresponds to a set of data fields among the plurality of data fields of the unstructured data;

identifying a plurality of sensitive fields among the set of data fields corresponding to the identified data-of-interest using text analytics, wherein each sensitive field among the plurality of sensitive fields is associated with a data subject preference, preset by the data subject; and processing the transaction request, by the one or more hardware processors, for the set of data fields corresponding to the data-of-interest in accordance with the data subject preference for each sensitive field in the data-of-interest, wherein the set of data fields are accessed using corresponding unique URI.

* * * * *